United States Patent
Connor

(10) Patent No.: US 9,630,281 B2
(45) Date of Patent: Apr. 25, 2017

(54) FLUX SHIELD FOR HEAT EXCHANGER

(71) Applicant: MAHLE Behr USA Inc., Troy, MI (US)

(72) Inventor: Jim Connor, Goose Creek, SC (US)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 145 days.

(21) Appl. No.: 14/169,217

(22) Filed: Jan. 31, 2014

(65) Prior Publication Data

US 2015/0219399 A1 Aug. 6, 2015

(51) Int. Cl.
*F28D 7/16* (2006.01)
*B23P 15/26* (2006.01)
*B23K 1/00* (2006.01)
*B23K 1/20* (2006.01)

(52) U.S. Cl.
CPC ............ *B23P 15/26* (2013.01); *B23K 1/0012* (2013.01); *B23K 1/203* (2013.01); *Y10T 29/4935* (2015.01)

(58) Field of Classification Search
CPC ........ B23K 1/203; B23K 1/0012; B23K 1/00; B23P 15/26; F28D 7/1669; Y10T 29/4935
See application file for complete search history.

(56) References Cited

U.S. PATENT DOCUMENTS 3,165,151 A * 1/1965 Astrup ................. F28D 1/0535
165/148
7,201,218 B2 * 4/2007 Hiyama ............... F28F 9/0224
165/173

* cited by examiner

*Primary Examiner* — Ryan J Walters
(74) *Attorney, Agent, or Firm* — Paul D. Strain, Esq.; Strain & Strain PLLC

(57) ABSTRACT

The invention relates to a flux shield to prevent flux introduction into the tubes of a heat exchanger core while a flux application process, with the flux shield comprising a first part and a second part, with the flux shield being placeable on a heat exchanger core, where the second part is insertable into the first part along an insertion-direction, with the first part forming a guidance element for the second part and with the two parts being translational movable relative to each other along the insertion-direction. The invention relates furthermore to a method for the production of a heat exchanger.

7 Claims, 5 Drawing Sheets

FLUX SHIELD FOR HEAT EXCHANGER

FIELD OF INVENTION

The invention relates to a flux shield to prevent flux introduction into the tubes of a heat exchanger core while a flux application process is provided, with the flux shield comprising a first part and a second part, with the flux shield being placeable on a heat exchanger core. Furthermore the invention relates to a method to produce a heat exchanger core by using a flux shield, which is built according to the invention.

STATE OF THE ART

Heat exchangers are usually made of a multitude of elements, which are preferably made of heat conducting materials such as metal. Common heat exchangers consist of a multitude of tubes, which are spaced apart by heat transmitting fins that are distributed between the tubes.

These parts can be bonded together in a brazing process. Therefore flux is applied to the fins and the tubes and possibly to further elements. In a succeeding process the parts are being brazed together. To prevent the flux from being applied to areas of the tubes and fins where flux is not needed, flux shields can be used. Flux shields act as a mask to cover up the areas where a flux application is not desired. A major task of these flux shields is to prevent flux application within the tubes. Flux in the tubes can lead to choking of the tubes, which would render the whole heat exchanger inoperative.

Flux shields that are used today are tailor-made for specific heat exchangers. Especially the different sizes, e.g. the length, of the heat exchanger cores, which consist essentially of the tubes and the fins, are causal for the need of different flux shields in different sizes.

Before the flux application process the heat exchanger cores can be subject to a degreasing process. Therefore heated air is introduced into the tubes to wash out grease and other unwanted particles within the tubes. Due to this requirement, the flux shields can be designed in a way that makes the introduction of heated air possible while at the same time prevents flux from getting into the tubes.

The solutions known in the state of the art are disadvantageous as a lot of different sized flux shields are needed for the huge variety of differently sized heat exchanger cores. This makes the progress of flux application time intensive and cost intensive as more flux shields are needed.

OBJECT OF THE INVENTION, SOLUTION, ADVANTAGES

Therefore it is the object of the invention to provide a flux shield, which is easily adaptable to heat exchanger cores of various dimensions, with the flux shield being easily producible with low production costs. Furthermore it is the object of the invention to provide a method to produce a heat exchanger by using a flux shield, which is built according to the object of the invention.

The object is achieved by the features of patent claim 1.

According to the invention a flux shield to prevent flux introduction into the tubes of a heat exchanger core while a flux application process is provided, with the flux shield comprising a first part and a second part, with the flux shield being placeable on a heat exchanger core, where the second part is insertable into the first part along an insertion-direction, with the first part forming a guidance element for the second part and with the two parts being translational movable relative to each other along the insertion-direction.

A flux shield that is adaptable to different length of different heat exchanger cores is advantageous, as the quantity of flux shields that are needed for the production of a wide variety range of heat exchangers can be relatively small compared to non-adaptable flux shields. It is beneficial if the length adjustment of the flux shield can be done manually without the need for further tools.

According to one advantageous refinement of the invention the first part and/or the second part has a c-shaped cross-section with at least one of the two areas, which form the end-sections of the c-shaped cross-section, is hook-shaped to provide footing for the respective other part.

It is advantageous, if one part builds the footing for the other part, so that the parts can easily be inserted into each other and are movable relative to each other. A c-shaped cross-section is very beneficial to create such footings by using hook-shaped end-sections. A c-shaped cross-section is furthermore easily obtainable by well-known forming processes.

In a further advantageous refinement, the inner contour of the cross-section of the first part follows the outer contour of the cross-section of the second part.

It is advantageous, when the inner contour of the outer part follows the outer contour of the inner part of the flux shield. This makes it easy to insert the parts into each other and gives enough brace support for the parts, so that the flux shield has a sufficient stability.

It is preferable, if the inner surface of the first part of the flux shield is in laminar contact with the outer surface of the second part of the flux shield, with the inner surface of the first part forming a sliding surface for the outer surface of the second part and vice versa.

Through a laminar wide-area contact between the first part and the second part a sufficient stability of the flux shield can be obtained, as the parts act as brace support for each other. It is beneficial if the first part forms sliding surfaces for the second part and vice versa, as no additional parts are needed to ensure the relative movement between the first part and the second part in a given direction.

Furthermore it is functional, if the c-shaped cross-sections of the free ends of the first part and the second part are each being closed by a cover-element, with the cover-elements being usable as stop elements against the outer edges of a heat exchanger core.

The cover-elements are beneficial to avoid flux introduction into the area that is covered by the flux shield. If the flux shield would have open cross-sections at the respective free ends of the first part and the second part, flux could be introduced via these open cross-sections to the object that should in fact be covered by the flux shield.

Furthermore it is beneficial, if the length of the flux shield along the insertion-direction is adjustable through the relative movement between the first part and the second part.

The adaption of the length of the flux shield by relative movement between the first part and the second part is advantageous, as the relative movement can be easily generated by pushing the parts into each other or pulling them out of each other.

Besides this it is preferable, if the flux shield is made out of metallic material, especially a 304 stainless steel. A stainless steel is advantageous, as it is very robust, easy to form, endurable and comparatively cheap.

Furthermore it is beneficial, if the first part and/or the second part is made by a deep drawing process and/or bending process and/or by continuous casting process.

These processes are well-known in the state of the art. Therefore it is easy and cheap to produce parts by using these forming processes.

In an additional embodiment it is preferable, if the first part and/or the second part features a stop element that limits the relative movement between the first part and the second part.

A stop element is advantageous, as it can be avoided that the parts are pulled out of each other unintentionally. The stop element can in a beneficial embodiment be built through a ledge on one part that acts as a bedstop for the other part. Alternatively corresponding dents or other surface structures can be used to limit the relative movement between the parts.

Embodiments of methods to produce a heat exchanger are also described herein.

According to the invention a method for the production of a heat exchanger core, where the heat exchanger core is built from a multitude of tubes that are arranged parallel to each other and are spaced apart by heat transmitting fins, with the heat exchanger core having at least one outer edge, to which the openings of the tubes are orientated is provided, comprising the following steps:
assembling of the tubes and the heat transmitting fins to a heat exchanger core,
placing a flux shield onto the outer edge of the heat exchanger core to cover the at least one outer edge,
adapting the flux shield to the length of the outer edge of the heat exchanger core by moving the first part relative to the second part along the insertion direction, along which the second part is inserted into the first part,
degreasing the outer surfaces of the heat exchanger core and the inner surfaces of the tubes,
applying a flux to the outer surfaces of the heat exchanger core,
removing the flux shield from the heat exchanger core,
brazing the tubes and heat transmitting fins together to form the heat exchanger core.

It is very advantageous to use an adaptable flux shield to cover certain parts of the heat exchanger core, as the flux shields can easily be used for differently sized heat exchanger cores. Especially flux shields that can be easily adapted to the length of the heat exchanger cores without using additional tools are beneficial, as they are easy to use. The flux shields are advantageously braced against the heat exchanger core in a way that ensures the continuance of the flux shield in the intended position. Preferably the flux shield is easily removable after the flux is applied.

By the use of such adaptable flux shields a sufficient masking of the areas of the heat exchanger core that should not be covered by flux can be obtained. This makes the production, especially the brazing process, easy and reliable.

Besides this it is preferable, if the flux shield forms a roof-like structure, which is protruding along the direction of the tubes over the outlines of the outer edge of the heat exchanger core. The roof-like structure is advantageous, as it forms a discharge area over which the applied flux can rinse of the flux shield without dropping onto the areas that should in fact be covered by the flux shield. A flux shield with a roof-like structure that is protruding from the outer edge, which is covered by the flux shield, is beneficial compared to a mask that simply is capping the openings in the tubes, as the introduction of flux from a certain direction is avoided while at the same time the introduction for a fluid, e.g. hot air, into the tubes for degreasing purposes is permitted.

In another embodiment it is favorable, if the tubes are accessible for a fluid, e.g. air, from a direction from underneath the roof-like structure that is built by the flux shield. The tubes being accessible for a fluid like hot air for degreasing purposes is beneficial, as the heat exchanger core and the flux shield can remain untouched between the degreasing and the flux application. This is due to the fact that the flux shield offers the possibility to introduce air into the tubes while at the same time restricts the application of flux into the tubes.

In another preferred embodiment the flux is applied to the heat exchanger core by spraying and/or pouring and/or brushing from a direction from above the roof-like structure that is built by the flux shield.

Depending on the flux that is used spraying, brushing or pouring can be the application method of choice. The flux shield is preferably formed in a way, that it limits the flux application to the areas that are covered by the flux shield while at the same time it does not impede the flux application to the other areas of the heat exchanger core.

Furthermore it is beneficial, if the heat exchanger core possesses two outer edges, with both outer edges showing openings of the tubes, with the two outer edges being arranged on opposing sides of the heat exchanger core and each of these two outer edges being covered by a flux shield.

Usually a heat exchanger core comprises a multitude of linear tubes that each have two openings on opposing end-sections. To avoid flux introduction on both openings it is beneficial to use two flux shields to cover the outer edges that show the openings of the tubes.

Further preferable embodiments of the invention are described in the claims and the following description of the drawing.

DESCRIPTION OF THE DRAWING

The invention is explained in detail below by means of an exemplary embodiment and with reference to the drawings, in which.

PREFERRED EMBODIMENTS OF THE INVENTION

Figure 1:
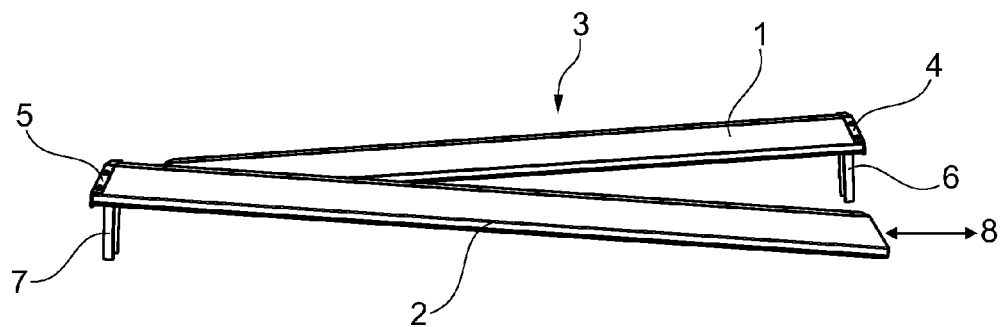
FIG. 1 shows the first part and the second part of the flux shield in a disassembled state.

FIG. 1 shows the first part 1 and the second part 2 of the flux shield 3. The second part 2 can be inserted into the first part 1 to form the flux shield 3. As shown in FIG. 1 it can be seen that both parts 1, 2 are much longer than they are wide. The second part 2 can be inserted into the first part 1 along the length of the parts 1, 2. The insertion direction, which is illustrated by the arrow with the reference number 8, is therefore parallel to the length of the parts 1, 2. The height of the parts 1, 2 is mainly influenced by the cover-elements 4, 5.

The first part 1 possesses a cover-element 4 at the right facing end and the second part 2 possesses a cover-element 5 at the left facing end. These cover-elements 4, 5 are used to close the c-shaped cross-sections of the first part 1 and the second part 2. Furthermore the cover-elements 4, 5 each have an extension 6, 7, which faces downwards from the first part 1 and the second part 2.

The extensions 6, 7 can be used to brace the flux shield 3 against the outer edges of a heat exchanger core, on which the flux shield 3 can be placed. The cover-elements 4, 5 are thereby used to close the open cross-sections on the free ends of the first part 1 and the second part 2 and furthermore are used to create a brace support between the flux shield 3 and a heat exchanger core. The cover-elements 4, 5 are connected to the parts 1, 2 by riveting. Riveting is advantageous as it is a well-known process, which can be easily controlled. In alternative embodiments other connecting methods can also be used.

The first part 1 and the second part 2 are movable relative to each other along the insertion direction 8 which is parallel to the length of the parts 1, 2. By moving the parts 1, 2 relative to each other the overall length of the flux shield 3 can be adjusted.

Figure 2:
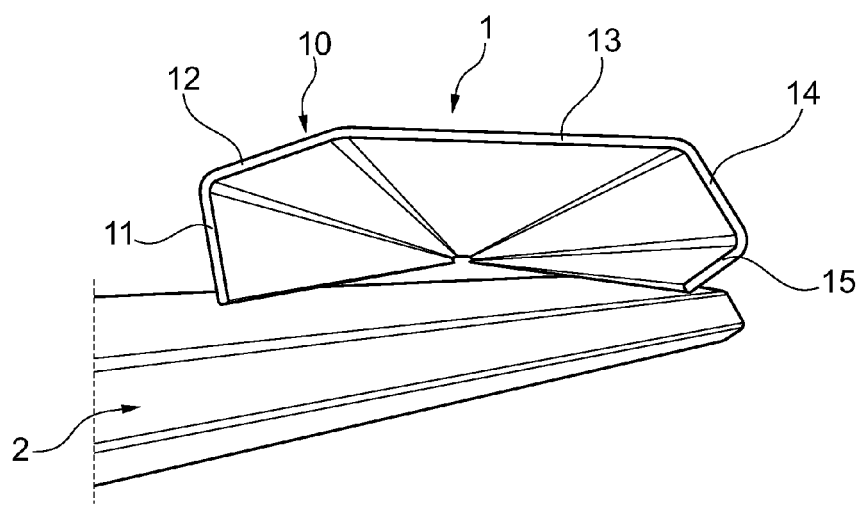
FIG. 2 shows the c-shaped cross-section of the first part.

FIG. 2 shows a view of the c-shaped cross-section 10 of the first part 1. The first part 1 is thereby placed upon the second part 2 for alignment reasons to achieve a better view.

The c-shaped cross-section 10 shows at the left end-section a first section 11 that is linked to a second section 12. The second section 12 is aligned to the first section 11 by an angle of approximately 90 degrees. A third section 13 is linked to the second section 12 and is aligned to the second section 12 in a very sharp angle of approximately 10 to 20 degrees. Following on the third section 13 is a fourth section 14, which is linked to the third section and aligned to it in an angle of less than 90 degrees, which is approximately 75 degrees. That fourth section 14 is linked to a fifth section 15, which forms a hook-shaped end-section on the right end of the c-shaped cross-section 10. The fifth section 15 is thereby aligned in an angle of approximately 90 degrees to the fourth section 14. The hook-shaped end-section is important to prevent the second part 2 from falling out of the first part 1. In advantageous refinements of the invention the end-sections, the left one and the right one, of the c-shaped cross-section 10 can show hook-shaped sections to avoid unwanted movement between the first part 1 and the second part 2.

Especially the first section 11 and the fifth section 15 act as a footing for the second part 2, which can be inserted into the first part 1. The insertion direction 8 is in FIG. 2 normal to the plane of projection. The c-shaped cross-section of the second part 2 is shaped as the c-shaped cross-section 10 of the first part 1. The dimensions of the second part 2 are smaller, so that it can fit into the first part 1.

The inner surfaces of the first part 1 are in laminar contact with the outer surfaces of the second part 2, when the second part 2 is inserted into the first part 1. This is because the outer surfaces of the second part 2 are aligned to the inner surfaces of the first part 1. Thereby a wide-area contact can be created between the first part 1 and the second part 2, which increases the stability of the flux shield 3 and gives a better guidance between the first part 1 and the second part 2, when inserted into each other. The outer surfaces of the second part 2 act as a sliding surface for the inner surfaces of the first part 1 and vice versa.

The first part 1 and the second part 2 can be produced by using bending processes, continuous casting processes or by using deep drawing processes. In alternative embodiments it is feasible to use bigger radiuses for the transition between the individual sections 11, 12, 13, 14 and 15 of the c-shaped cross-section 10. It is also feasible to create the cross-section of the first part 1 and the second part 2 by a continuous arch with varying radiuses.

The first section 11 and the second section 12 form an area that is used as a bracing area for the heat exchanger core. The flux shield 3 can be placed with this bracing area on the outer edge of a heat exchanger core, which shows the openings of the tubes. The tubes are usually plugged in a tube plate, which increases the stability of the heat exchanger core. The tube plate is usually arranged right next to the outer edge of the heat exchanger core. The flux shield 3 can be placed especially on the tube plate where the bracing area, which is formed by the first section 11 and the second section 12, is used to hold the tube plate and/or the outer edge of the heat exchanger core. The tube plate can be a planar body with bent boundary areas. The boundary areas are thereby preferably bent in a 90 degree angle to the planar portion of the tube plate. The planar portion of the tube plate hereby offers the openings through which the tubes can be plugged. The bent boundary area of the tube plate can be placed alongside the second section 12 of the c-shaped cross-section 10. This results in a better fit between the flux shield 3 and the heat exchanger core and helps to align the flux shield against the heat exchanger core.

The sections 13, 14 and 15 are not in direct contact with the heat exchanger core, when the flux shield 3 is placed on the heat exchanger core. They form a roof-like structure that is protruding from the heat exchanger core in a direction that is normal to the cross-section of the openings of the tubes or the planar portion of the tube plate. The roof-like structure is used to prevent flux, which can be applied on the heat exchanger core, to flow into the openings of the tubes where it can choke the tubes.

The roof-like structure is especially advantageous against flux that is applied from above, as the roof-like structure builds a barrier for fluids coming from above. Due to the alignment of the third section 13 to the second section 12 the roof-like structure descends from the upper end of the outer edge of the heat exchanger to the lower end of the outer edge. Thereby the openings of the tubes are protected against flux introduction from above.

Figure 3:
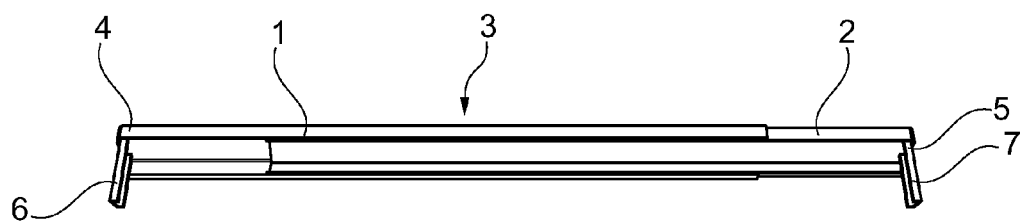
FIG. 3 shows a view of the assembled flux shield, which comprises the first part and the second part.

FIG. 3 shows a view of the assembled flux shield 3. The second part 2 is inserted into the first part 1. The flux shield 3 is lying flat on the hook-shaped sections of the first part 1 and the second part 2, which is built by the fourth section 14 and the fifth section 15. Besides that the flux shield 3 is laying on the extensions 6 and 7 of the cover-elements 4 and 5. The second part 2 is pulled out of the first part 1 by approximately one-fifth of the length of part 1.

Figure 4:
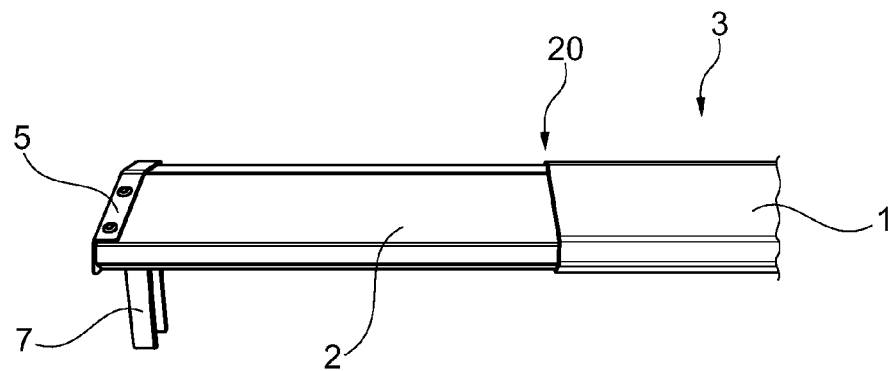
FIG. 4 shows a detailed view of the joint section where the second part is inserted into the first part.

FIG. 4 shows a detailed view of the joint area 20 between the first part 1 and the second part 2. As it can be seen in FIG. 4 the general shape of the second part 2 is following the shape of the first part 1, which is already described in detail in the preceding figures. The first part 1 acts as a channel for the second part 2, which can be moved relative to the first part 1 to enlarge or to reduce the length of the flux shield 3.

To prevent the second part 2 from being pulled out of the first part 1 a stop element can be placed on the first part 1 and/or the second part 2. This stop element can be used to limit the relative movement between the parts 1, 2. The stop element can for instance be realized by corresponding dents in the parts 1, 2 or by a bedstop that acts as a barrier to limit the relative movement.

Figure 5:
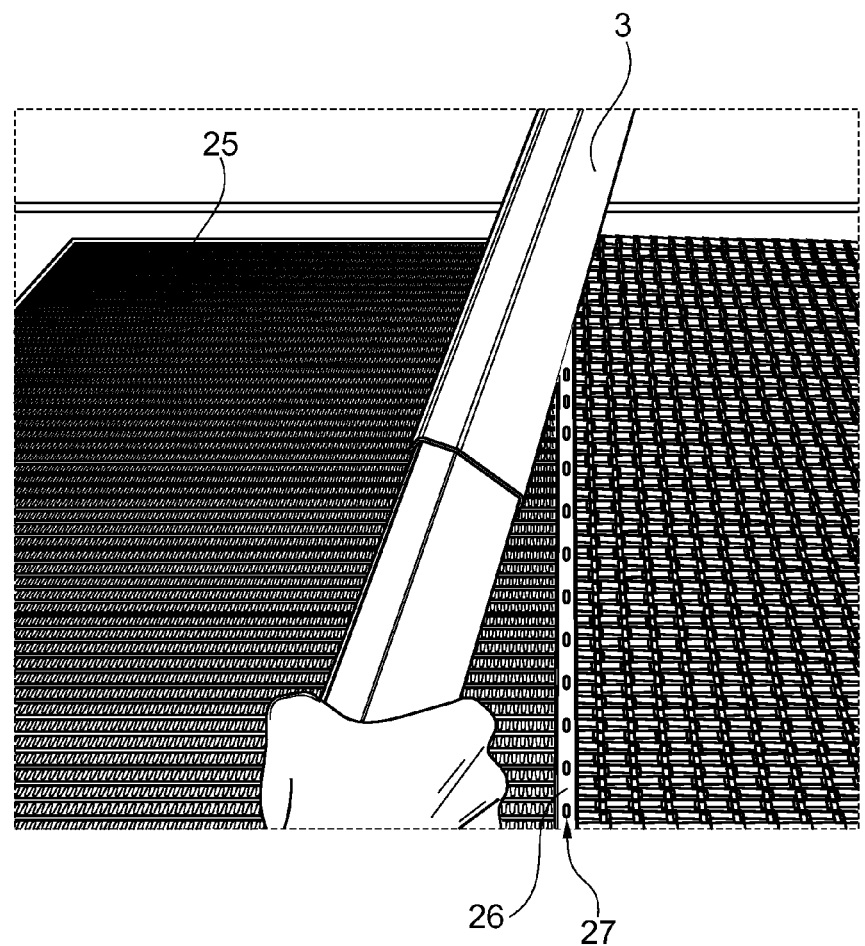
FIG. 5 shows the flux shield, already shown in the preceding figures, being placed upon a heat exchanger core.

FIG. 5 shows a step of the production process where the flux shield 3 is placed on the heat exchanger core 25. The heat exchanger core 25 comprises a multitude of tubes, which are spaced apart by a multitude of heat transmitting fins. The tubes are plugged into a tube plate 26 at one of the outer edges 27 of the heat exchanger core 25. In FIG. 4 especially the bent boundary area of the tube plate 26 can be seen. The tubes are plugged into the tube plate 26 with one of their end-sections. The second end-sections are plugged in a second tube plate, which is identical to the tube plate 26 shown in FIG. 5.

The outer edges, which are opposed to each other on the heat exchanger core 25, can be covered by one flux shield 3 each.

The heat exchanger core 25 is placed on a conveyer belt that transports the heat exchanger core 25 through different machines to apply different treatments to it. One of the treatments is the degreasing of the heat exchanger core 2 and another treatment is the application of flux on the heat exchanger core 25.

Figure 6:
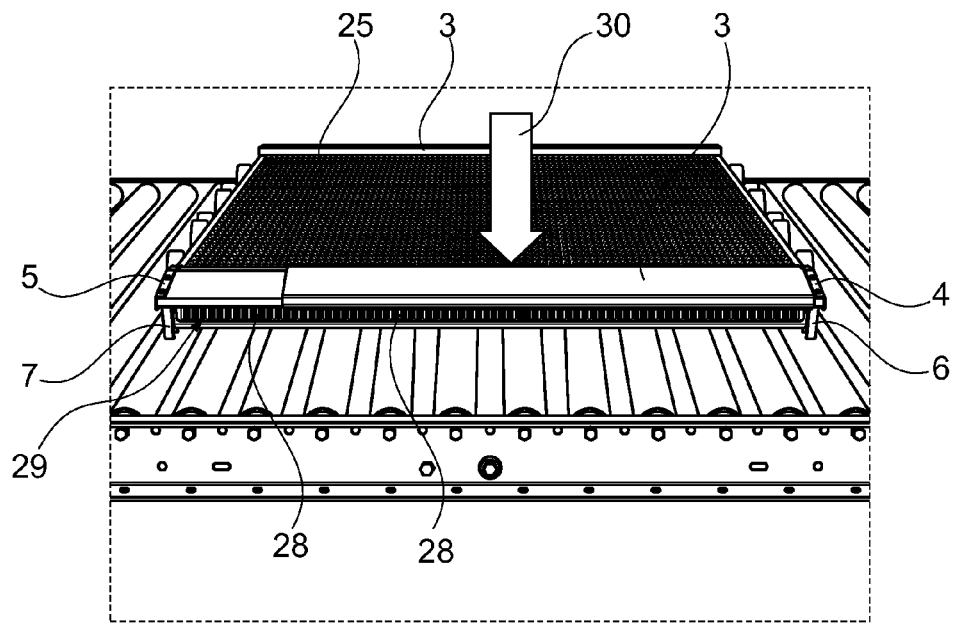
FIG. 6 shows a view of a heat exchanger core with two flux shields being applied to the heat exchanger core.

FIG. 6 shows the heat exchanger core 25 with two flux shields 3 on two opposing outer edges of the heat exchanger core 25. As can be seen in FIG. 6 the flux shield 3 builds a roof-like structure that protects the openings of the tubes 28 from the introduction of flux. The roof-like structure thereby hangs over the outer edge 29 so as to avoid flux introduction form above. This is especially advantageous when the flux is sprayed, poured or brushed to the heat exchanger core 25 from a direction that is indicated by the arrow marked with the reference number 30.

Furthermore it can be seen in FIG. 6 that the flux shield 3 is braced against the heat exchanger core 25 by the cover-elements 4, 5 and the extensions 6, 7. In an advantageous process step the flux shield 3 is prolonged by pulling the second part 2 out of the first part 1 to a length that is greater than the length of the outer edge 29 of the heat exchanger core 25. Than the flux shield 3 is placed on the heat exchanger core 25 from above. By pushing the second part 2 back into the first part 1 the length of the flux shield 3 can be adapted to the length of the outer edge 29 of the heat exchanger core 25.

The backlash between the first part 1 and the second part 2 after assembling is advantageously in a range where it is high enough to allow a manual adjustment of the length of the flux shield 3 without the need for further tools, and at the same time low enough, so that the retention force between the first part 1 and the second part 2 is big enough to allow the flux shield 3 to be fixed on the heat exchange core 25. The flux shield 3 can thereby preferably be jammed to the heat exchanger core 25 by pushing the first part 1 and the second part 2 together until the cover-elements 4, 5 brace the heat exchanger core 25.

Figure 7:
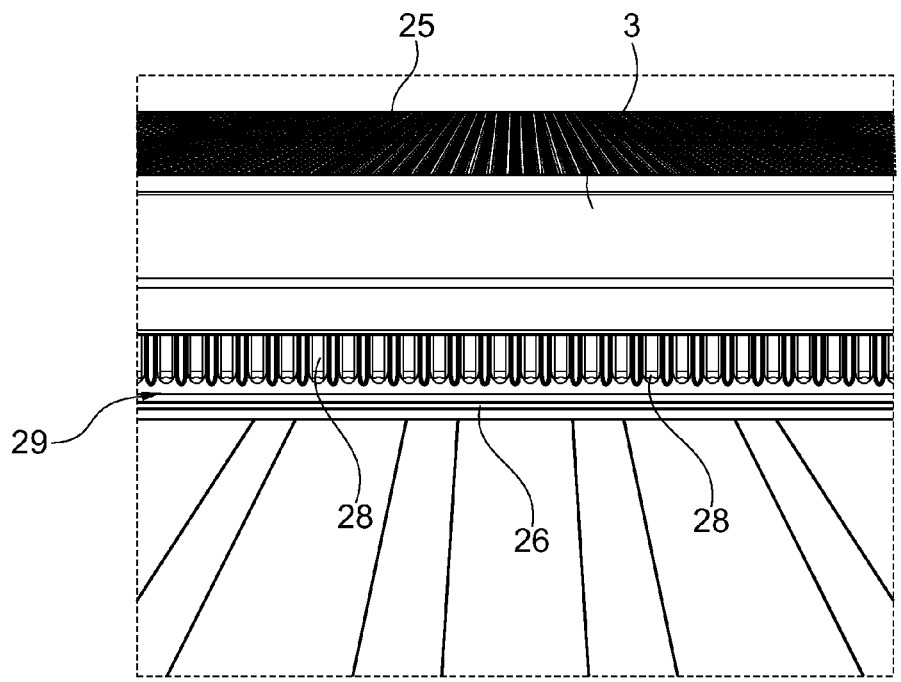
FIG. 7 shows a detailed view of the outer edge of the heat exchanger core, which is covered by a flux shield.

FIG. 7 shows a detailed view of the outer edge 29 that is covered by the flux shield 3. In FIG. 7 the tubes 28 can be seen while they are plugged into the tube plate 26. The heat exchanger core 25 is in FIG. 7 still placed on a conveyer belt which is built by a multitude of cylinders on which the heat exchanger core 25 can be rolled.

Figure 8:
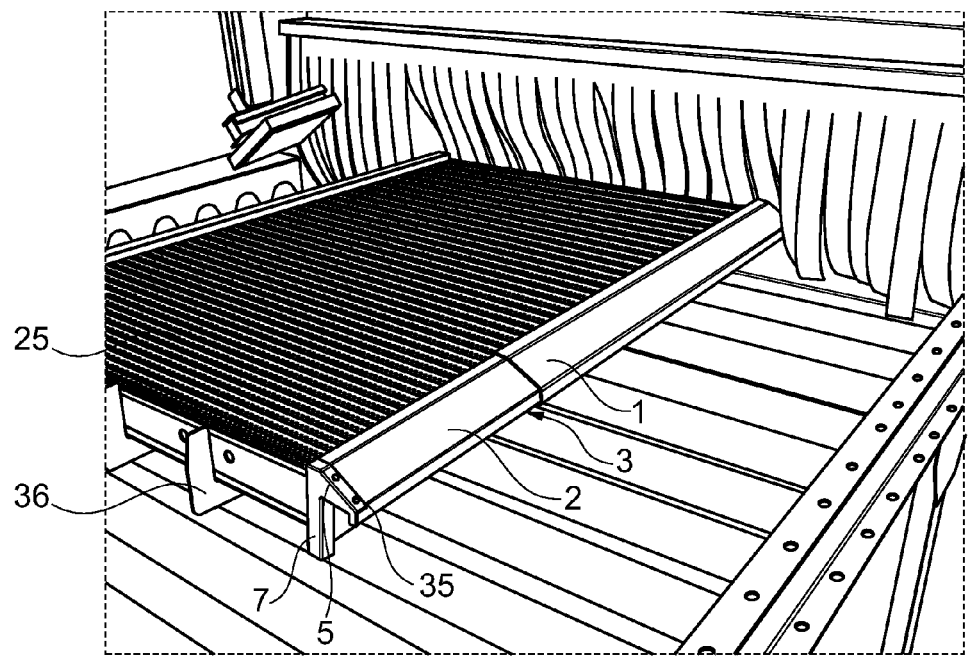
FIG. 8 shows a perspective view of the heat exchanger core with the applied flux shields while the heat exchanger core is being transported into a fluxing machine.

FIG. 8 shows a perspective view of the heat exchanger core 25 with two flux shields 3 as it is already shown in FIG. 6. FIG. 8 shows especially the cover-element 5 of the second part 2 which is L-shaped. The extension 7 forms the longer flank of the cover-element 5. The section of the cover-element 5 that covers the c-shaped cross-section of the free end of the second part 2 forms the shorter flank. As can be seen in FIG. 8 the cover-element 5 is connected to the second part 2 by rivets 35.

The tube plate 26 has a bent boundary area which runs beneath the extension 7 of the cover-element 5. The cover-element 5 and especially the extension 7 are covering the tube plate 26 in a way that the deposition of flux is avoided.

In FIG. 8 the heat exchanger core 25 is rolled into a machine where the flux is applied onto the heat exchanger core 25. As already shown in the preceding FIGS. 6 and 7 the heat exchanger core 25 is covered by two flux shields 3 on opposing outer edges.

Figure 9:
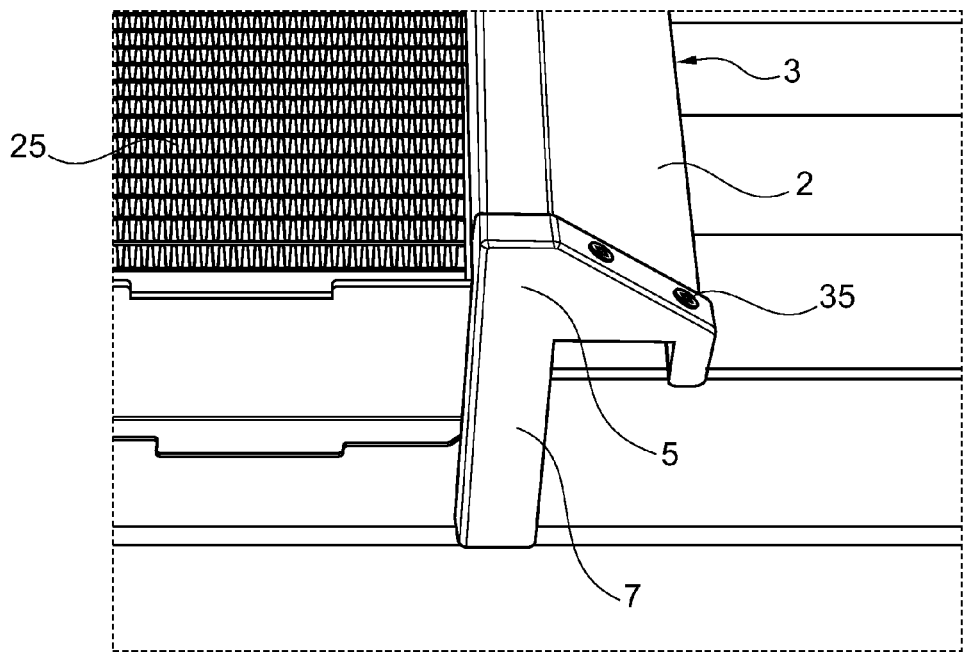
FIG. 9 shows a detailed view of the cover-element on one of the ends of the flux shield.

FIG. 9 shows a detailed view of the cover-element 5 that is connected by rivets 35 to the second part 2 of the flux shield 3. As can be seen in FIG. 9 the cover-element 5 covers the whole c-shaped cross-section and furthermore the tube plate 26 (not shown in FIG. 9) in a way, so that no flux will be applied to it. According to another embodiment of the invention the cover-element might be connected to the second part e.g. by welding.

In all preceding FIGS. 5 to 8 the heat exchanger core 25 consists of the tubes 28, the heat transmitting fins and the tube plates 26 in which the tubes 28 are plugged with their respective end-sections. The elements are not connected to each other permanently. They are only stuck together and are fixed to each other by a fixture 36, which creates a force in a direction perpendicular to the direction of the tubes 28. Only after the flux is applied and the elements are brazed together a permanent connection is reached. The flux shields 3 will be removed before the brazing process to avoid a permanent connection between the flux shields and the heat exchanger core 25. The flux shields 3 are not disposable and are built for reuse.

Figure 10:
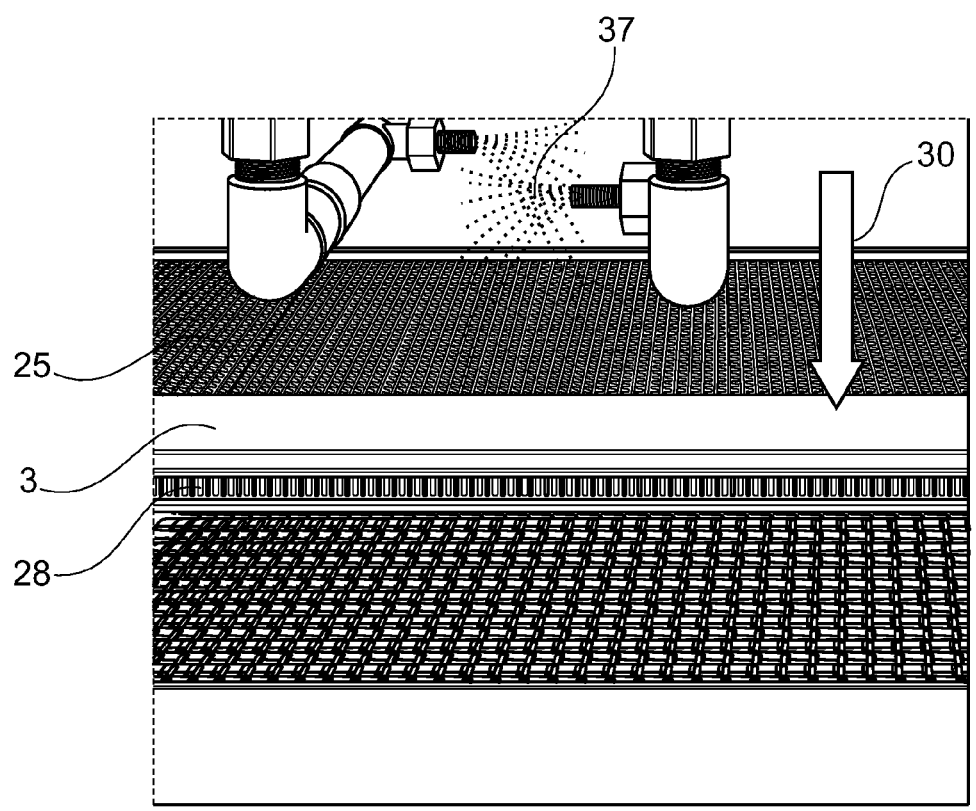
FIG. 10 shows the heat exchanger core with the applied flux shields in a fluxing machine, where flux is applied to the heat exchanger core via a spray from above.

FIG. 10 shows the heat exchanger core 25 with the flux shields 3 in the fluxing machine where flux is applied by a spraying from above. The flux is pressed through nozzles, which are arranged above the heat exchanger core 25. This results in a flux spray. The flux spray is shown in the center of the FIG. 10 and is directed along the arrow that is indicated with the reference number 30.

The flux is either deposited to the tubes 28 and the heat transmitting fins of the heat exchanger core 25 or onto the flux shield 3. Due to the roof-like structure of the flux shield 3 the flux that is deposited on the flux shield 3 will run of the flux shield 3 and drop down on the conveyer belt, on which the heat exchange core 25 is placed. The openings of the tubes 28 are thereby kept clean from flux, so that a choking of the tubes 28 can be avoided.

While the invention has been shown in the FIGS. 1 to 10 in one preferred embodiment, it will be clear to those skilled in the arts to which it pertains that a variety of modifications and changes can be made thereto without departing from the scope of the invention.

LIST OF REFERENCE SIGNS 01 first part
02 second part
03 flux shield
04 cover-element
05 cover-element
06 extension
07 extension
08 insertion direction
10 c-shaped cross-section 11 first section
12 second section
13 third section
14 fourth section
15 fifth section
20 joint section
25 heat exchanger core
26 tube plate
27 outer edge
28 tube
29 outer edge
30 arrow
35 rivet
36 fixture
37 spray

The invention claimed is:

1. A flux shield to prevent flux introduction into a plurality of tubes of a heat exchanger core during a flux application process,
wherein the flux shield comprises a region arranged over an outer edge of the heat exchanger core, wherein said region comprises a roof-like structure formed over a plurality of ends of the plurality of tubes without capping said tubes,
wherein the flux shield comprises a first part and a second part,
wherein the first part and the second part comprise a c-shaped cross-section, and wherein at least one of the first part or the second part comprises an end-section which comprises a hook-shaped section, wherein the first part comprises a guidance element for the second part, wherein an inner surface of the first part is in laminar contact with an outer surface of the second part, wherein the inner surface of the first part forms a sliding surface for the outer surface of the second part and vice versa,
wherein the second part comprises a region which is inserted into the first part along an insertion-direction, wherein the first part and the second part are not fixedly attached to each other allowing translational movement relative to each other along the insertion-direction.

2. The flux shield as claimed in claim 1, wherein an inner contour of a cross-section of the first part corresponds to an outer contour of a cross-section of the second part.

3. The flux shield as claimed in claim 1, wherein a first cover element closes a free end of the first and a second cover element closes a free end of the second part, wherein the first and second cover elements are usable as stop elements against outer edges of the heat exchanger core.

4. The flux shield as claimed in claim 1, wherein the flux shield is adjustable along the insertion-direction through the relative translational movement between the first and second part.

5. The flux shield as claimed in claim 1, wherein the flux shield is made out of metallic material.

6. The flux shield as claimed in claim 1, wherein the first part and the second part are made by a deep drawing process, by a bending process, or by a continuous casting process.

7. The flux shield as claimed in claim 1, wherein the first part and the second part each comprise a stop element that limits the relative movement between the first part and the second part.

* * * * *